Figure 1:
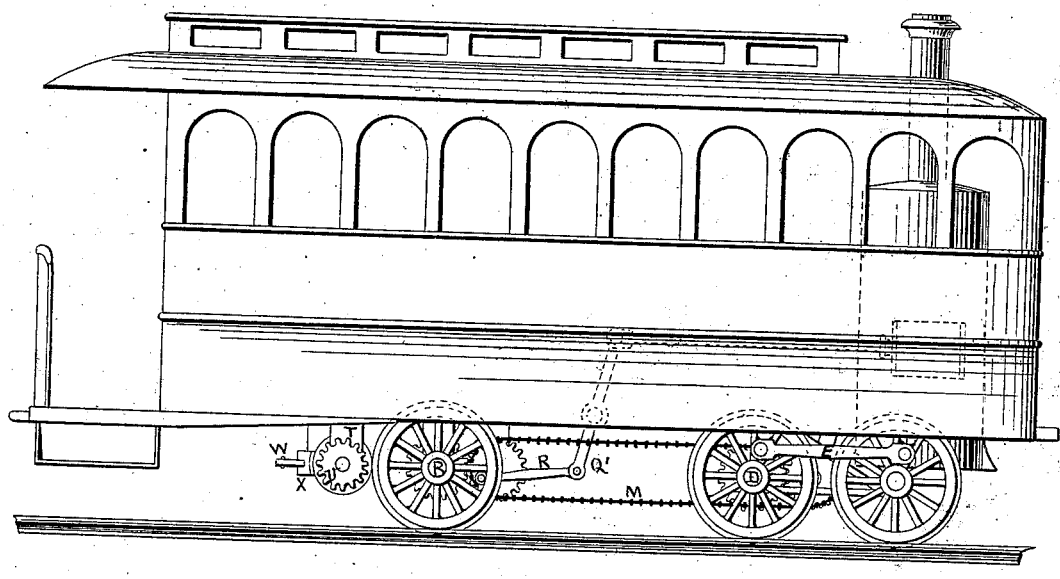

2 Sheets—Sheet 1.

W. A. GILDAY.
Street-Car Motor.

No. 228,057.    Patented May 25, 1880.

Witnesses:
Geo. W. Miatt
Arthur R. Robertson

Inventor:
Wm A. Gilday
By his Attorney
David A. Burr

W. A. GILDAY.
Street-Car Motor.

No. 228,057.  Patented May 25, 1880.

2 Sheets—Sheet 2.

Witnesses:
Geo. W. Miatt
Arthur R. Robertson

Inventor:
Wm A. Gilday
By his Attorney
David A. Burr

UNITED STATES PATENT OFFICE.

WILLIAM A. GILDAY, OF PHILADELPHIA, PENNSYLVANIA.

STREET-CAR MOTOR.

SPECIFICATION forming part of Letters Patent No. 228,057, dated May 25, 1880.

Application filed September 13, 1879.

*To all whom it may concern:*

Be it known that I, WILLIAM A. GILDAY, a citizen of the United States, residing at Philadelphia, in the State of Pennsylvania, have invented a new and useful Improvement in Driving Mechanism for Motor Street-Cars, of which the following is a specification.

It consists, first, in pivoting the front end of the frame of the car to a four-wheeled truck designed to support and carry the same by a center-pin placed about one-third nearer to the rear than to the front axle, so that the front wheels shall be free to act as guide-wheels; and in driving the wheels of the truck by coupling them in pairs on each side and combining with the rear axle a spur-wheel which shall gear and intermesh directly in line under the center-pin of the truck with a corresponding spur-wheel of equal diameter revolving upon a shaft supported by hangers from the frame or body of the car.

The faces of the cogs upon the shaft spur-wheel are preferably made wider than those of the axle spur-wheel, and the face of each wheel and of its cogs is made to conform transversely to the arc of a circle whose radius equals the diameter of the wheel.

The object of this part of my invention is to reduce to a minimum the friction, first, of the truck-wheels upon the rails, second, of the bearing between the truck and car, and, third, of the mechanism connecting the motor with the driving-wheels of the truck by such a construction and combination of the parts as shall in the first place bring the two axles of the truck as closely together as possible, so as to approximate the distance between them to the radii of the curves in the track, and thus prevent lateral slip of the wheels against the rails, and shall, in the second place, by removing the center-pin to a point nearer to the rear than to the front axle, prevent thereby the wheels from "slewing," or assuming a position diagonal to the rails, (which causes them to either bind to the rails or jump the track,) and also relieve the front wheels of weight and increase their efficiency as guide-wheels, and yet load them sufficiently to prevent them from readily leaving the track, and shall, in the third place, by the use of spur-wheels of equal diameter intermeshing in line with the center-pin of the truck for the purpose of communicating motion to its wheels, facilitate the free movement of the truck when directly geared to the motive mechanism, and yet retain the advantages of a center-pin removed from the front axle and of axles brought closely together, as described.

My invention consists, secondly, in the combination of a four-wheeled swinging truck having its wheels on each side connected by suitable coupling-rods, and which is placed under the front end of a car, with a single axle and pair of wheels driven by the car-motor and placed just far enough to the rear of the front truck to prevent the rear end of the car supported thereby from plunging, the single rear driving-axle and the axles of the forward swinging truck being geared to move in unison by suitable intermediate gearing.

The object of this part of my invention is to facilitate the operation of the driving mechanism by conveying the power of the engine directly to a pair of wheels placed in the rear, which, having one-half the tractive power of the front connected wheels, will slip upon the rails with comparative ease, and thus conform to the action of the front wheels under the abnormal resistance which they encounter in turning curves, and will prevent an undue strain upon the intermediate connecting-gearing and the consequent breakage thereof.

My invention consists, thirdly, in the combination of the front pivoted truck with the rear driving-axle by means of two sets of intermediate chain-gearing carried upon shafts independently of the axles of the car, the independent shafts being connected with the truck and driving-axles by means of interposed cog-wheels.

The object of this part of my invention is, first, to avoid the unequal tension and strain upon the chain-gearing, when the car-wheels pass over rail-joints or other rough places or over stones or obstacles on the track, which results from the application of the chain-gearing directly to the car-axles, as has heretofore been done; second, to avoid the delays attendant upon an accident to the chain-gearing by providing two separate chains, either of which may be used independently of the other; and, third, to permit the whole driving mechanism to be fully inclosed from the dust and the weather.

It consists, fourthly, in applying a brake to the rear axle of the car by means of cog-teeth upon the inner side of the wheels or by spur-wheels secured to the axle, to be engaged as required by pinion-wheels upon a shaft having a horizontal to-and-fro movement in its bearings and carrying a friction-wheel to bear against a stationary friction-block, the friction-shaft being thrown into gear with its axle by means of a lever and block operating to bear against the friction-wheel and to force it simultaneously against the stationary block, the object of this part of my invention being to apply a brake to the car by throwing a shaft into gear with the rear axle of the car and simultaneously applying friction to said shaft, so as to retard its revolution, the friction-shaft being automatically disengaged and thrown out by suitable springs when the operating-lever is released.

My improved driving mechanism, as an entirety, works throughout in perfect harmony in any and all positions which the car in its progress may properly assume, and the car impelled thereby will run smoothly and easily with the least possible wear and tear of its moving parts.

Figure 2:
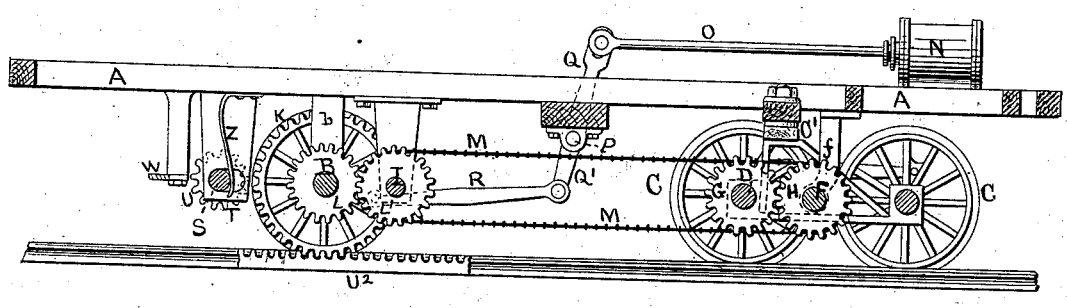
Figure 3:
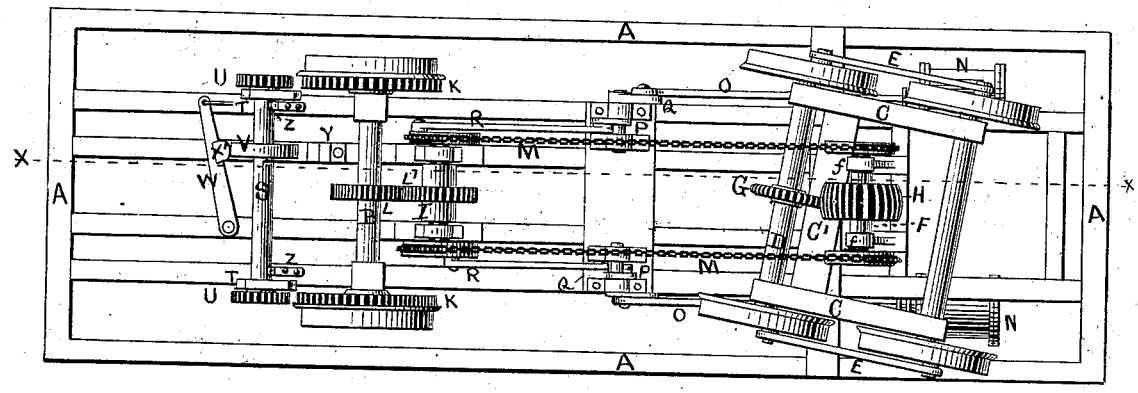

In the accompanying drawings, Figure 1 is an elevation of a street-car fitted with my invention; Fig. 2, a vertical longitudinal section in line $x\ x$ of Fig. 3. Fig. 3 is a bottom view of the frame and running-gear of the car, and Fig. 4 a sectional view of the spur-wheels connecting the axle of the pivoted truck with the driving-shaft on the frame.

A A represent the frame, made to support, in the customary manner, the body of the car, as well as the boiler, cylinder, and driving mechanism of its engine. B is the rear axle, revolving in journal-boxes supported by suitable pedestals $b\ b$, securely fixed to the frame A in the usual manner.

C C is a four-wheeled truck, and C' its bolster, by means of which it is pivoted to the frame A. Instead of being placed midway between the axles in the customary manner, this bolster C' is upheld by means of suitable shaped brackets, as shown in Fig. 2, so as to lessen the weight upon the front wheels. The truck so pivoted will follow a straight line without the aid of flanged wheels and rails, the front wheels acting thereby more truly as guides for the rear wheels, while the increase of the distance between the pivotal axis and the front wheels as compared with the rear wheels permits the truck to swing more readily in turning a curve with the least possible frictional resistance on the rail. The wheels are connected on either side of the truck by outside coupling-rods, $e\ e$, Fig. 1, so as to move in unison.

F is a transverse driving-shaft, supported in suitable bearings immediately in front of the rear axle, D, of the truck, and in the same horizontal plane therewith, by means of hangers $f\ f$ rigidly secured to the frame A of the car, and which project downward therefrom in front of the bolster C of the truck at such an angle as to suspend the shaft under said bolster.

Figure 4:
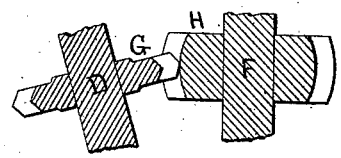

The driving-shaft D is fitted with a central cog-wheel, G, Figs. 3 and 4, having rounded or cone-shaped teeth, and the driving-shaft F is fitted likewise with a counterpart cog-wheel, H, of equal diameter, but having a wider and convexed face. (See Fig. 1.) These spur-wheels are arranged to gear and intermesh centrally immediately beneath the center-pin or pivot or king-bolt of the truck in a right vertical line therewith, so as to remain in operative contact at any angle which the rear axle, D, may assume with reference to the driving-shaft F in the running of the car. They are also preferably so proportioned in diameter as that the king-bolt immediately over their line of contact shall be removed twice as far from the front as from the rear axle of the truck. Two-thirds of the weight supported by the truck will thus be thrown upon the rear, and one-third only upon the front, axle. This arrangement gives the front wheels a proper leverage upon the pivoted truck and greatly facilitates the turning of curves, while sufficient weight is carried thereby to prevent them from leaving the track.

I, Figs. 2 and 3, is a second driving-shaft suspended in suitable fixed bearings from the frame A, immediately in front of the rear axle, B, of the car, and in the same horizontal plane. The axle B and the shaft are geared together by cog-wheels L L, and the two separate driving-shafts F and I are geared together by two strong endless chains, M M, passing over sprocket-wheels secured at either end of said shafts, as illustrated in the drawings. N N, Figs. 2 and 3, are the cylinders, and O O the piston-rods of the engine.

P P, Fig. 3, are rock-shafts supported in suitable bearings beneath the frame, and from which extend in opposite directions the arms Q Q'. To the upper arms, Q, are connected the piston-rods O, and to the lower arms, Q', are connected pitmen R R, engaging crank-pins secured at right angles upon the outer face of the sprocket-wheels of the rear driving-shaft, T. (See Figs. 2 and 3.) The shaft I is thus driven by the pistons of the engine working horizontally in the most effective manner, and motion is imparted by means of the endless chains, spur-wheels, and coupling-rods equally to all the wheels of the car irrespective of the position of its pivoted truck, converting them all substantially into driving-wheels with great advantage, while the greatest weight is placed upon the wheels which are most effective for traction.

The operative mechanism, being all secured to the frame of the car, may be inclosed independently of the body of the car, and thus effectually protected from mud and dust. At the same time they are not subject to any strain from the movements of the body of the car, which may be independently supported upon springs on the frame.

S, Figs. 1, 2, and 3, is an auxiliary shaft placed in the rear of the rear axle of the car, and whose journal-bearings have horizontal play in the hangers T T, by which they are supported. Upon the ends of this shaft are keyed pinion-wheels U U, to engage cogs K, formed upon the inner side of the flanges of the rear car-wheels or to spur-wheels keyed to the axle B. The horizontal play of the shaft permits the pinions to be geared or ungeared from said cogs or spur-wheels by its movement to and from them.

V, Fig. 3, is a friction-pulley secured to the shafts S; W, a brake-lever pivoted to the frame of the car, and carrying a block, X', which, by a movement of the lever, may be brought to bear powerfully against the friction-wheel V, and thereby carry the shaft S into gear with the spur-wheels upon the car-axle B.

Y is a stationary block secured to the frame, and against which the friction-wheel V may be forced by the block and lever X' W when the shaft S is thrown into gear with the axle B. The brake-lever W is arranged to be operated by means of the customary appliances from either end of the car.

Z Z are springs operating to throw back the friction-shaft out of gear with the spur-wheels K K when the lever W is released.

When power is applied to the lever W the pinions U U are brought into gear with the spur-wheels on the axle B, and the friction-pulley V is brought into contact with and held between the stationary blocks X' and Y, so as to retard the revolution of the shaft S, and consequently check the whole propelling mechanism and arrest the revolution of all the wheels, both of the stationary and pivoted axles.

The friction-pulley and blocks may be inclosed with the driving machinery, and thus protected from dust or rain, so as to retain their efficiency unimpaired thereby.

The cogs K, formed upon the inner side of the rear wheels, are so placed as to freely clear the rails. They may be advantageously employed for the secondary purpose of engaging a rack, U², Fig. 2, laid alongside of the rails upon the steep grades of the track, so as to facilitate the ascent of such heavy grades.

I claim as my invention—

1. The combination, with the rear axle of a four-wheeled car-truck whose center-pin or pivotal axis is placed nearer to the rear than to the front axle, of a spur-wheel supported in bearings suspended from the frame of the car, gearing with a second spur-wheel of equal diameter secured centrally upon the rear axle, and intermeshing with the first directly in line with the center-pin of the truck, substantially as and for the purpose herein set forth.

2. The combination of the wheels of a single axle driven mediately by a suitable motor and disposed to support and carry the rear end of a street-car with the four wheels of a pivoted truck carrying the front end of the car, and with coupling-bars connecting said truck-wheels on each side in pairs, and intermediate gearing transmitting the power applied to the hind wheels of the car simultaneously to the hind wheels of the truck, substantially as and for the purpose herein set forth.

3. The combination of a traversing shaft, S, friction-pulley V, pinions U U, and springs Z Z with a lever, W, and spur-wheels K K upon the rear axle of the car, substantially in the manner and for the purpose set forth.

4. The combination of the rear axle and wheels of a street-car, the axles and wheels of the pivoted truck of the car, and coupling-bars connecting the wheels on each side of said truck, with shafts revolving in bearings fixed to the frame of the car, and geared by cog-gearing, the one to the rear axle of the pivoted truck and the other to the rear axle of the car, and with chain-gearing connecting said shafts, and suitable mechanism for driving the same, all substantially in the manner and for the purpose herein set forth.

WM. A. GILDAY.

Witnesses:
H. A. HAWORTH,
J. L. WILT, Jr.